(12) United States Patent
Gavioli et al.

(10) Patent No.: US 12,126,483 B2
(45) Date of Patent: Oct. 22, 2024

(54) BITS-TO-SYMBOLS MAPPING FOR AMPLITUDE MODULATION

(71) Applicant: Nokia Solutions and Networks Oy, Espoo (FI)

(72) Inventors: Giancarlo Gavioli, Usmate Velate (IT); Luca Gabriele Razzetti, Sesto San Giovanni (IT); Carlo Costantini, Casatenovo (IT); Andreas Leven, Bietigheim Bissingen (DE)

(73) Assignee: Nokia Solutions and Networks Oy, Espoo (FI)

(*) Notice: Subject to any disclaimer, the term of this patent is extended or adjusted under 35 U.S.C. 154(b) by 42 days.

(21) Appl. No.: 17/988,332

(22) Filed: Nov. 16, 2022

(65) Prior Publication Data

US 2023/0164017 A1    May 25, 2023

(30) Foreign Application Priority Data

Nov. 24, 2021 (EP) ..................... 21210156

(51) Int. Cl.
*H04L 27/36* (2006.01)
*H04B 10/556* (2013.01)
*H04L 27/34* (2006.01)

(52) U.S. Cl.
CPC ....... *H04L 27/364* (2013.01); *H04B 10/5561* (2013.01); *H04L 27/3405* (2013.01); *H04L 27/3433* (2013.01); *H04L 27/366* (2013.01)

(58) Field of Classification Search
CPC .......................... H04B 10/548; H04B 10/556; H04B 10/5561; H04B 10/541; H04B 10/516;

(Continued)

(56) References Cited

U.S. PATENT DOCUMENTS 9,337,935 B2 * 5/2016 Batshon ............. H04B 10/5161
9,929,813 B1    3/2018 Batshon et al.
(Continued)

FOREIGN PATENT DOCUMENTS

WO    WO 2020/020463    1/2020

OTHER PUBLICATIONS

Constant Composition Distribution Matching, Schulte et al., Mar. 17, 2015, pp. 1-5. (Year: 2015).*

*Primary Examiner* — Betsy Deppe
(74) *Attorney, Agent, or Firm* — Nokia Technologies Oy

(57) ABSTRACT

Architectures for inter-converting bitstreams and symbol streams of PAM and/or QAM constellations of different sizes that are not base-2 integers. Some of such constellations may be Gray-coded, and the constellation mapping may be performed to achieve an equiprobable distribution of different constellation symbols. Some embodiments may be compatible with FEC schemes. In an example embodiment, a transmitter DSP may employ a conventional constellation mapper preceded by an electronic encoder programmed to exclude some constellation-symbol labels from the bitstream applied to the mapper. In different embodiments, the electronic encoder may employ a CCDM and/or a long-division operation to select some amplitudes of the constellation and to exclude others. At least some embodiments are beneficially capable of achieving a smaller gap to the Shannon limit than comparable conventional solutions.

10 Claims, 12 Drawing Sheets

(58) Field of Classification Search
CPC ......... H04B 10/50; H04L 27/34; H04L 27/36;
H04L 27/3405; H04L 27/3433; H04L
27/364; H04L 27/366; H04L 27/3411
See application file for complete search history.

(56) References Cited

U.S. PATENT DOCUMENTS

| | | |
|---|---|---|
| 10,396,899 B1 | 8/2019 | Kim et al. |
| 10,972,215 B2 * | 4/2021 | Cho ..................... H04B 10/808 |
| 11,121,903 B2 * | 9/2021 | Torbatian ............. H04B 10/541 |
| 2021/0218496 A1 | 7/2021 | Koganei et al. |

* cited by examiner 100
k=3

200
(k, x)

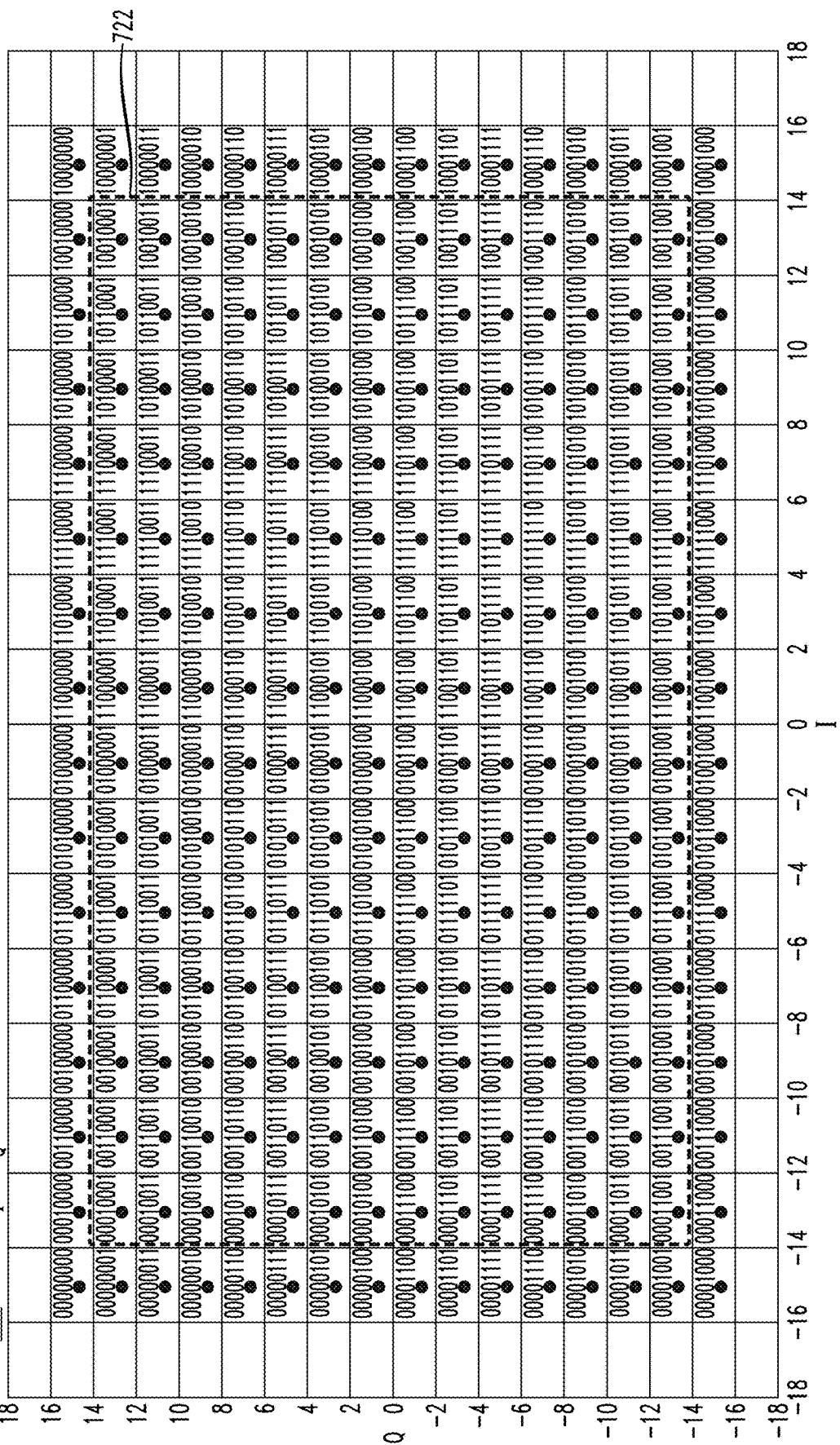

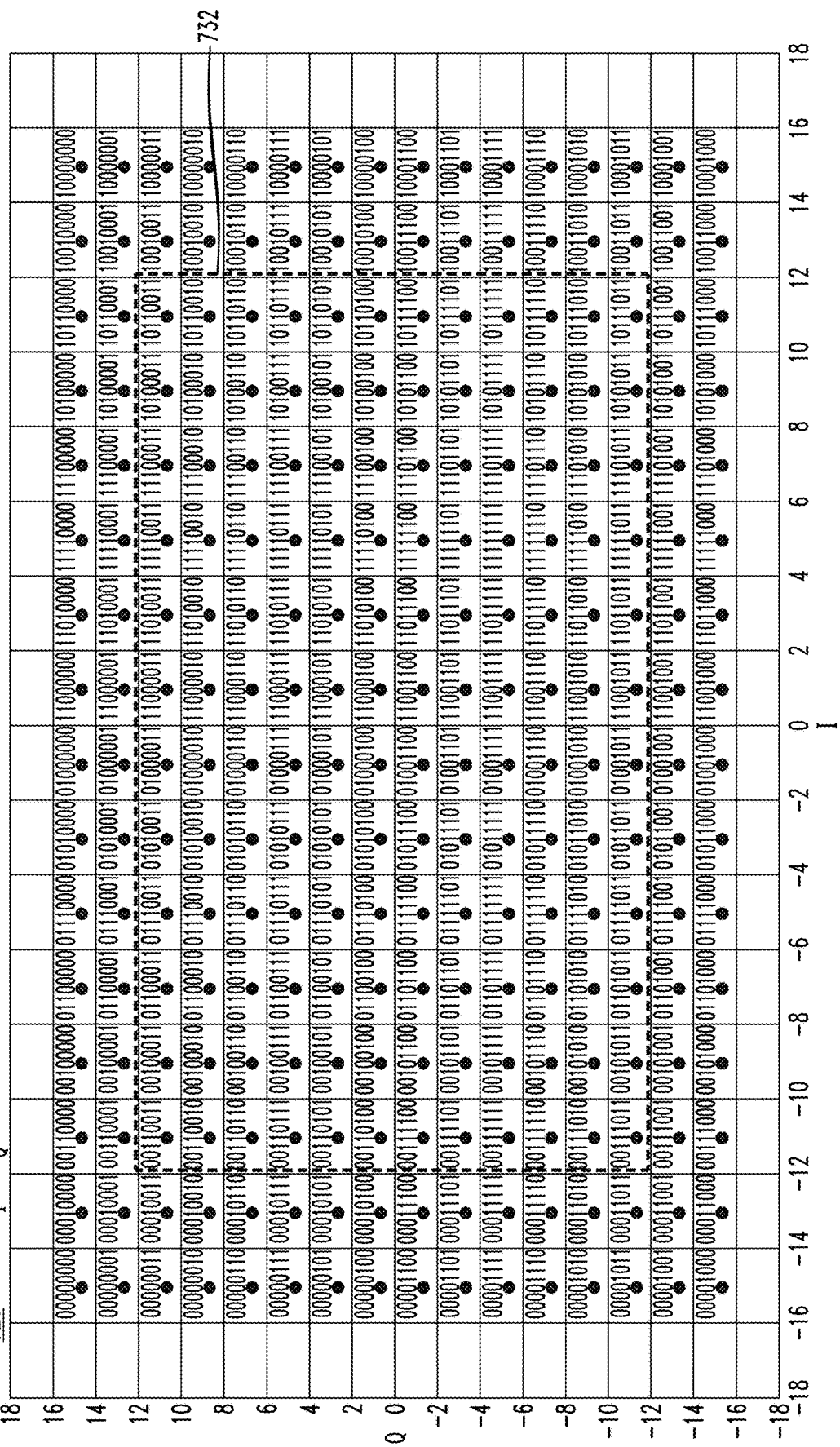

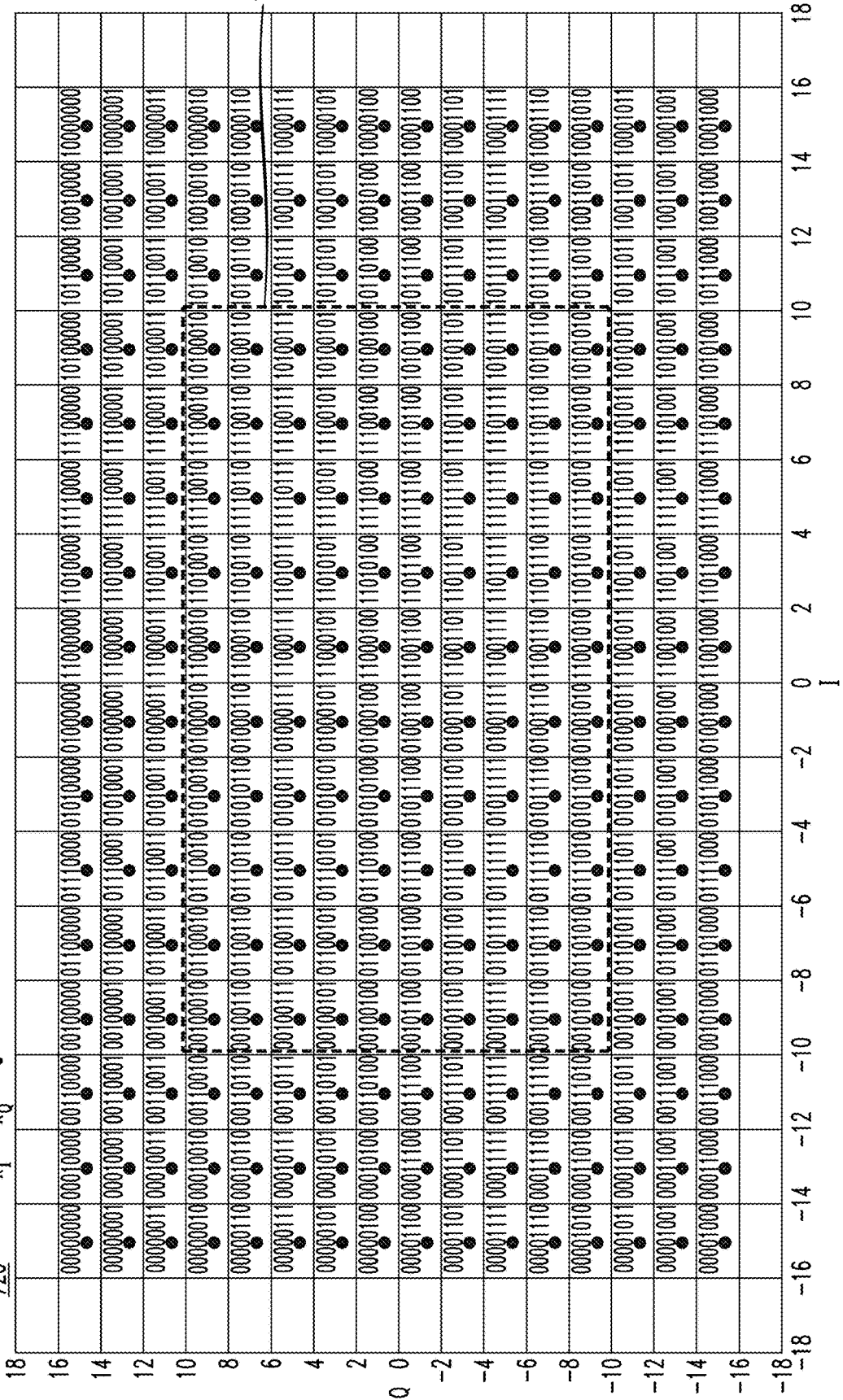

BITS-TO-SYMBOLS MAPPING FOR AMPLITUDE MODULATION

CROSS-REFERENCE TO RELATED APPLICATION

This application claims priority to Patent Application EP 21210156.2, filed in the European Patent Office on Nov. 24, 2021.

BACKGROUND

Field

Various example embodiments relate to communication equipment and, more specifically but not exclusively, to digital modulation.

Description of the Related Art

This section introduces aspects that may help facilitate a better understanding of the disclosure. Accordingly, the statements of this section are to be read in this light and are not to be understood as admissions about what is in the prior art or what is not in the prior art.

A constellation diagram is a graphical representation of a modulated signal generated using a digital-modulation scheme, such as Pulse Amplitude Modulation (PAM), Quadrature Amplitude Modulation (QAM), Phase Shift Keying (PSK), or the like. Such a constellation diagram may display the modulated signal as a scatter plot of constellation points on the complex IQ plane. The distance of a particular constellation point from the origin of the IQ plane represents the amplitude in the symbol space.

The number N of constellation points (also referred to as constellation symbols) in the constellation diagram may be selected to be a base-2 integer, i.e., $N=2^k$, where k is a positive integer. Each of such constellation symbols can then be used to encode exactly k bits, i.e., each constellation symbol can be assigned a corresponding unique k-bit word, often referred to as a label. Different communication systems may employ different constellation-labeling schemes for inter-converting bitstreams and symbol streams.

SUMMARY OF SOME SPECIFIC EMBODIMENTS

Disclosed herein are various embodiments of architectures for inter-converting bitstreams and symbol streams of PAM and/or QAM constellations of different sizes, e.g., that are not base-2 integers. Some of such constellations may be Gray-coded, and the constellation mapping may be performed to achieve an equiprobable distribution of different constellation symbols. Some embodiments may be compatible with FEC schemes. In an example embodiment, a transmitter DSP may employ a conventional constellation mapper preceded by an electronic encoder programmed to exclude some constellation-symbol labels from the bitstream applied to the mapper. In different embodiments, the electronic encoder may employ a CCDM (Constant Composition Distribution Matching) and/or a long-division operation to select some amplitudes of the constellation and to exclude others. At least some embodiments are beneficially capable of achieving a smaller gap to the Shannon limit than comparable conventional solutions.

In various embodiments, the above architectures can be used in fiber-optic, wireless, and wireline data-communication systems.

According to an example embodiment, provided is an apparatus, comprising an optical data transmitter including: an optical modulator; and an electronic controller to operate the optical modulator to optically output a sequence of symbols in response to a bitstream, the electronic controller being configured to select the symbols by Gray-coded mapping of a $4B^2$-QAM constellation, where $B \neq 2^k$, B and k are positive integers, and B is greater than one.

According to another example embodiment, provided is an apparatus, comprising a data transmitter including: a front-end circuit; and an electronic controller to operate the front-end circuit to output a data-modulated signal carrying a sequence of symbols; and wherein the electronic controller comprises: a constellation mapper to select symbols for the sequence in response to a bitstream and based on symbol labels of a constellation; and an electronic encoder to generate the bitstream in response to a data stream such that the bitstream carries labels of a subset of symbols of the constellation.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 7A-7D graphically illustrate several QAM constellations that can be implemented using the QAM constellation mapper of FIG. 6 according to example embodiments;

DETAILED DESCRIPTION

Herein, the same or similar reference numbers typically refer to similar steps, functions, structures, and/or signals of various embodiments.

In digital communications, Gray codes play an important role in error correction. For example, in a PAM or QAM modulation scheme, Gray coding may be used to label constellation symbols such that the bit-words conveyed by adjacent constellation symbols differ from one another by only one bit. A data-transmission system designed to use this type of labeling together with a forward-error-correction (FEC) scheme capable of correcting single-bit errors may thus very effectively correct transmission errors that cause symbol measurements to deviate into the areas corresponding to adjacent constellation symbols. Such error correction can beneficially make the corresponding transmission system less susceptible to noise.

Figure 1:
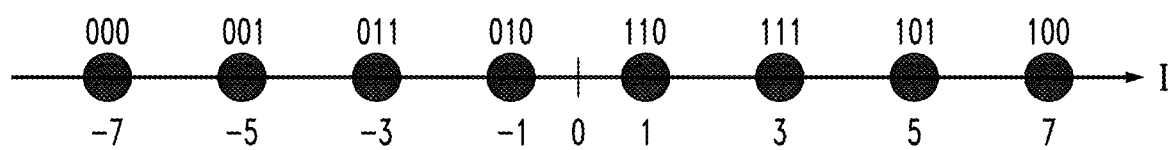
FIG. 1 graphically illustrates example Gray coding of an 8-PAM constellation.

FIG. 1 graphically illustrates example Gray coding of a $2^k$-PAM constellation 100. In this particular example, k=3 and N=$2^k$=8. There are N/2 (=4) different absolute amplitude values, $\{A_n\}$, expressed as follows:

$$A_n = 1 + 2(n-1) \quad (1)$$

where n=1, ..., N/2. Each of the eight constellation points represents one of the eight signed amplitudes $\pm A_n$, i.e., one of −7, −5, −3, −1, 1, 3, 5, and 7. Each of the corresponding eight labels has k (=3) bits. The most-significant bit (MSB) of each label can be referred to as the sign bit. The two least-significant bits (LSBs) of each label can be referred to as the amplitude label.

In the example shown in FIG. 1, the binary values of the labels are generated using a reflected double-Gray mapping scheme. According to this scheme, the constellation points located in the positive I-half of constellation 100 have: (i) the sign-bit value of "one" and (ii) amplitude labels generated using conventional Gray mapping. The labels of the constellation points located in the negative I-half of constellation 100 are generated by flipping the sign bit of the corresponding constellation-point labels of the positive I-half. With this type of labeling, the amplitude labels of the constellation points are symmetric, and the sign bits of the constellation points are anti-symmetric with respect to the origin of the I-aXIs.

A person of ordinary skill in the pertinent art will readily understand that a similar approach can be used for generating labels of a constellation or a constellation portion that uses the Q dimension of the IQ plane. A person of ordinary skill in the pertinent art will also be aware of the fact that many different implementations of Gray coding can be used in commercial products and various off-the-shelf PAM and QAM Gray-code mappers.

Some data-transmission systems may benefit from the use of PAM modulation formats characterized by non-integer information rates, e.g., the information rates between those provided by conventional 4-PAM (2 bits/symbol), 8-PAM (3 bits/symbol), 16-PAM (4 bits/symbol), and 32-PAM (5 bits/symbol). Some data-transmission systems may benefit from the use of QAM modulation formats characterized by intermediate information rates, e.g., information rates between those provided by conventional 16-QAM (4 bits/symbol), 64-QAM (6 bits/symbol), 256-QAM (8 bits/symbol), and 1024-QAM (10 bits/symbol). Some of such intermediate information rates may be integer, e.g., 5 or 7 bits/symbol, while others may be non-integer. Some of such data-transmission systems may require the transmitted QAM symbols to form a rectangular or square QAM constellation labeled using Gray coding. Some of such data-transmission systems may also require different transmitted symbols to have substantially the same relative probability of occurrence, i.e., to have an equiprobable distribution.

One example data-transmission system that may benefit from some of the above-indicated combinations of features is an inter-datacenter network employing medium-reach, terrestrial fiber-optic links. Disadvantageously, conventional modulation formats may not provide at least some of the above-indicated combinations of features.

Figure 2:
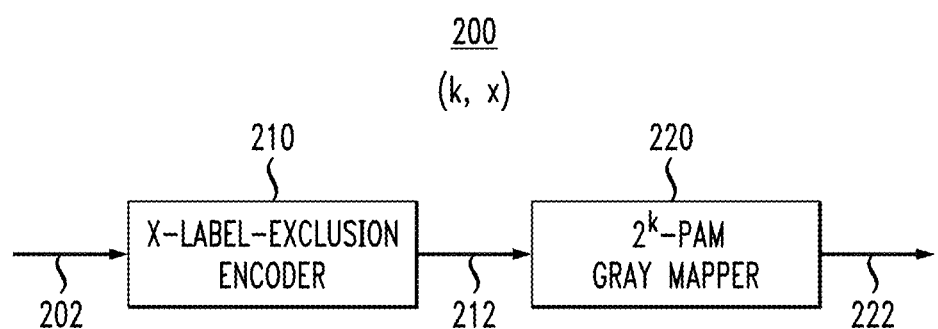
FIG. 2 shows a block diagram of a PAM constellation mapper according to an embodiment.

FIG. 2 shows a block diagram of a PAM constellation mapper 200 according to an embodiment. Mapper 200 comprises an electronic x-label-exclusion encoder 210 and a $2^k$-PAM Gray mapper 220 serially connected as indicated in FIG. 2. The positive integers k and x are the configuration parameters of mapper 200.

In an example embodiment, mapper 220 can be a conventional $2^k$-PAM Gray mapper. In operation, a conventional $2^k$-PAM Gray mapper converts an input bitstream into an output stream of signed amplitudes of the corresponding Gray-coded $2^k$-PAM constellation. The conversion is performed by: (i) parsing the input bitstream into k-bit words; and (ii) substituting each of the k-bit words by the corresponding signed amplitude $A_n$ in accordance with the labeling used in the operative constellation (e.g., see FIG. 1). When the input bitstream is an equiprobable (e.g., random or pseudorandom) bit sequence, i.e., has a 50/50 average probability of occurrence of binary "ones" and "zeros," the resulting output stream of signed amplitudes generated by the mapper has an equiprobable distribution of the signed amplitudes.

Electronic encoder 210 is programmed to convert an input bitstream 202 into a corresponding bitstream 212, which is a concatenation of codewords of the encoder. There are ($2^k$-x) different codewords. When input bitstream 202 is an equiprobable bit sequence, the resulting bitstream 212 has an equiprobable average distribution of the codewords, i.e., each of the codewords of encoder 210 has the same average probability of occurrence in bitstream 212. In response to this bitstream 212, mapper 220 operates to generate an output stream 222 of signed amplitudes corresponding to the codewords. The equiprobable average distribution of the codewords of encoder 210 in bitstream 212 causes output stream 222 to have an equiprobable distribution of the signed amplitudes corresponding to those codewords.

Each of the codewords of electronic encoder 210 is k-bit long and belongs to a selected subset of the labels of the $2^k$-PAM constellation of mapper 220. As already indicated above, the full set of labels of such $2^k$-PAM constellation has N=$2^k$ different labels. Encoder 210 is programmed to exclude x of those labels from being the codewords thereof. Thus, depending on the number x, the subset of labels selected by electronic encoder 210 for generating bitstream 212 may, e.g., consist of: (N-2) labels for x=2; (N-4) labels for x=4; (N-6) labels for x=6, and so on. The excluded labels do not appear in bitstream 212. In an example embodiment, the labels excluded from the codewords of electronic encoder 210 may be the labels corresponding to one or more specific absolute amplitude values $A_n$ (also see Eq. (1)). Several specific examples described in more detail below in reference to constellation 100 (FIG. 1) further illustrate the label-exclusion scheme implemented in electronic encoder 210.

First, let us consider an embodiment in which electronic encoder 210 is programmed to exclude labels corresponding to a single absolute amplitude value, e.g., $A_4$ (=7), of constellation 100. The corresponding signed amplitudes are $\pm A_4$ ($=\pm 7$). The two labels, 000 and 100, corresponding to those signed amplitudes (see FIG. 1) are not included in (i.e., are excluded from) the codewords of encoder 210. Thus, in this particular embodiment, x=2. The N-x (=6) codewords of encoder 210 are 001, 010, 011, 111, 110, and 101 (also see FIG. 1). Bitstream 212 generated by this particular embodiment of encoder 210 carries some sequence of these six codewords, with the exact composition of the sequence depending on the composition of input bitstream 202.

Although the largest absolute amplitude value (i.e., $A_4$) of constellation 100 is selected for the label exclusion in this particular example embodiment, a different absolute amplitude value, e.g., any one of $A_1$, $A_2$, and $A_3$, may alternatively be selected for the label exclusion in an alternative embodiment.

Second, let us consider an alternative embodiment in which electronic encoder 210 is programmed to exclude labels corresponding to two absolute amplitude values, e.g., $A_3$ (=5) and $A_4$ (=7), of constellation 100. The corresponding signed amplitudes are $\pm A_3$ ($=\pm 5$) and $\pm A_4$ ($=\pm 7$). The four labels, 001, 101, 000, and 100, corresponding to those signed amplitudes (also see FIG. 1) are not included in (i.e., are excluded from) the codewords of electronic encoder 210. Thus, in this particular embodiment, x=4. The N-x (=4) codewords of electronic encoder 210 are 010, 011, 111, and 110 (also see FIG. 1). Bitstream 212 generated by this particular embodiment of electronic encoder 210 carries some sequence of these four codewords, with the exact composition of the sequence depending on the composition of input bitstream 202.

Although the two largest absolute amplitude values (i.e., $A_3$, $A_4$) of constellation 100 are selected for the label exclusion in the latter example embodiment, any other pair of absolute amplitude values may alternatively be selected for the label exclusion in an alternative embodiment. The two absolute amplitude values selected for the label exclusion do not need to be consecutive.

Figure 4:
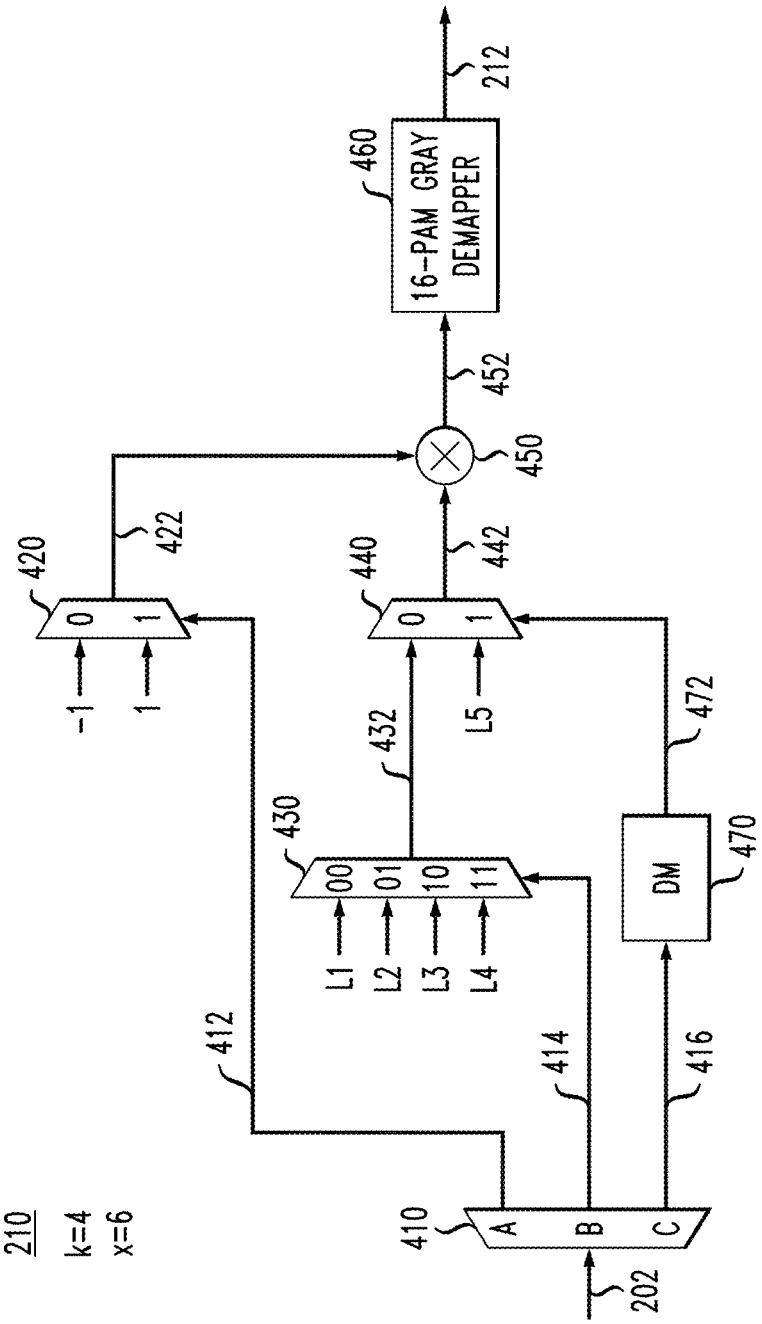
FIG. 4 shows a block diagram of an electronic encoder that can be used in the PAM constellation mapper of FIG. 2 according to another embodiment.

For embodiments corresponding to larger (e.g., corresponding to k>3) PAM constellations, three or more absolute amplitude values may similarly be selected for the label exclusion in electronic encoder 210 (e.g., see FIG. 4).

Several example circuits that can be used to implement electronic encoder 210 are described in more detail below in reference to FIGS. 3-5 and 8.

In some alternative embodiments, the $2^k$-PAM constellation of mapper 220 may not necessarily be Gray-coded.

Figure 3:
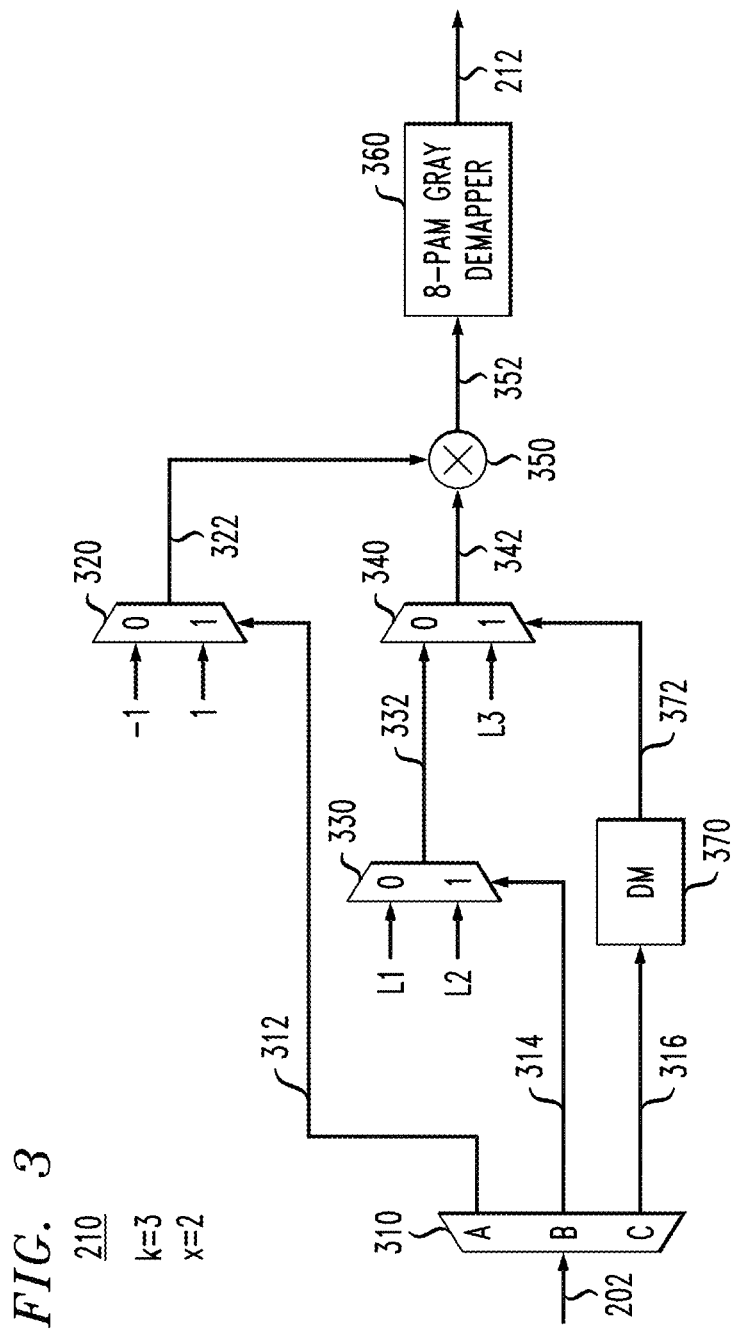
FIG. 3 shows a block diagram of an electronic encoder that can be used in the PAM constellation mapper of FIG. 2 according to an embodiment.

FIG. 3 shows a block diagram of electronic encoder 210 (FIG. 2) according to an embodiment. This particular embodiment of electronic encoder 210 corresponds to k=3 and x=2. Bitstreams 202 and 212 are explicitly shown in FIG. 3 to better illustrate the relationship between the circuits shown in FIGS. 2 and 3.

As shown in FIG. 3, electronic encoder 210 comprises a demultiplexer (DMUX) 310 having an input port and three output ports, labeled A, B, and C, respectively. The input port of DMUX 310 is connected to receive bitstream 202 (also see FIG. 2). DMUX 310 operates to demultiplex bitstream 202 into bitstreams 312, 314, and 316, which are outputted from ports A, B, and C, respectively.

Bitstream 312 controls the output of a sign selector 320. More specifically, in response to a binary "zero" of bitstream 312, selector 320 outputs −1 for a digital stream 322. In response to a binary "one" of bitstream 312, selector 320 outputs 1 for digital stream 322. When bitstream 312 is an equiprobable bitstream, the values of 1 and −1 occur in digital stream 322 with the equal probability of 1/2.

Bitstream 314 controls the output of a level selector 330. More specifically, in response to a binary "zero" of bitstream 314, selector 330 outputs the value of L1 for a digital stream 332. In response to a binary "one" of bitstream 314, selector 330 outputs the value of L2 for digital stream 332. When bitstream 314 is an equiprobable bitstream, the values of L1 and L2 occur in digital stream 332 with the equal probability of 1/2.

Bitstream 316 is applied to a distribution matcher (DM) 370. In an example embodiment, DM 370 can be a binary Constant Composition Distribution Matcher (CCDM). As known in the pertinent art, distribution matching can be used to transform an equiprobable (e.g., random or pseudo-random) bit sequence into a bit sequence with a desired probability ratio for binary "zeros" and "ones." In this particular embodiment, DM 370 is programmed to transform an equiprobable bitstream into a bitstream, wherein the probabilities (Pr) of occurrence of binary "zeros" and "ones" are 2/3 and 1/3, respectively. Thus, in operation, DM 370 transforms an equiprobable bitstream 316 into a bitstream 372, wherein Pr(0)=2/3 and Pr(1)=1/3. A person of ordinary skill in the pertinent will readily understand how to make and use such a DM without any undue experimentation.

Bitstream 372 controls the output of a level selector 340. More specifically, in response to a binary "zero" of bitstream 372, selector 340 outputs, for a digital stream 342, the level value provided by digital stream 332. In response to a binary "one" of bitstream 372, selector 330 outputs the value of L3 for digital stream 342. Due to the above-indicated configurations of DM 370 and level selectors 330 and 340, digital stream 342 has the values of L1, L2, and L3 occurring therein with equal probabilities, i.e., Pr(L1)=Pr(L2)=Pr(L3)=1/3.

In an example embodiment, the values of L1, L2, and L3 can be selected as follows: $L1=A_1$, $L2=A_2$, and $L3=A_3$. Thus, in this particular embodiment, $A_4$ is excluded. There are two corresponding labels in constellation 100, i.e., 000 and 100, corresponding to $-A_4$ and $+A_4$, respectively. These two labels are excluded from the codewords of this particular embodiment of encoder 210.

In alternative embodiments, any one of $A_1$, $A_2$, and $A_3$ may be excluded.

Encoder 210 further comprises a multiplier 350 and an 8-PAM demapper 360. In operation, multiplier 350 generates a stream 352 of signed amplitudes by multiplying the values provided by digital streams 322 and 342. 8-PAM demapper 360 then operates to convert each of the signed amplitudes of stream 352 into a corresponding 3-bit label of the operative constellation, thereby generating bitstream 212. When the operative constellation is constellation 100 and the selected levels are $L1=A_1$, $L2=A_2$, and $L3=A_3$, bitstream 212 carries a sequence of the labels 001, 010, 011, 111, 110, and 101, with the exact composition of this sequence depending on the composition of bitstream 202.

In some embodiments of mapper 200 employing the above-described electronic encoder 210 of FIG. 3, the 8-PAM mapper 220 (FIG. 2) and 8-PAM demapper 360 (FIG. 3) may not necessarily be programmed to use identically labeled 8-PAM constellations.

FIG. 4 shows a block diagram of electronic encoder 210 (FIG. 2) according to another embodiment. This particular embodiment of electronic encoder 210 corresponds to k=4 and x=6. Bitstreams 202 and 212 are explicitly shown in FIG. 4 to better illustrate the relationship between the circuits of FIGS. 2 and 4.

As shown in FIG. 4, electronic encoder 210 comprises a DMUX 410 having an input port and three output ports, labeled A, B, and C. The input port of DMUX 410 is connected to receive bitstream 202 (also see FIG. 2). DMUX 410 operates to demultiplex bitstream 202 into bitstreams 412, 414, and 416, which are outputted from ports A, B, and C, respectively.

Bitstream 412 controls the output of a sign selector 420. More specifically, in response to a binary "zero" of bitstream 412, selector 420 outputs −1 for a digital stream 422. In response to a binary "one" of bitstream 412, selector 420 outputs 1 for digital stream 422. When bitstream 412 is an equiprobable bitstream, the values of 1 and −1 occur in digital stream 422 with the equal probability of 1/2.

Bitstream 414 controls the output of a level selector 430. More specifically, in response to a binary "00" of bitstream 414, selector 430 outputs the value of L1 for a digital stream 432. In response to a binary "01" of bitstream 414, selector 430 outputs the value of L2 for digital stream 432. In response to a binary "10" of bitstream 414, selector 430 outputs the value of L3 for digital stream 432. In response to a binary "11" of bitstream 414, selector 430 outputs the value of L4 for digital stream 432. When bitstream 414 is an equiprobable bitstream, the values of L1, L2, L3, and L4 occur in digital stream 432 with the equal probability of 1/4.

Bitstream 416 is applied to a DM 470. In an example embodiment, DM 470 can be a binary CCDM. In this particular embodiment, DM 470 is programmed to transform an equiprobable bitstream into a bitstream, wherein the probabilities of occurrence of binary "zeros" and "ones" are 4/5 and 1/5, respectively. Thus, in operation, DM 470 transforms an equiprobable bitstream 416 into a bitstream 472, wherein Pr(0)=4/5 and Pr(1)=1/5. A person of ordinary skill in the pertinent will readily understand how to make and use such a DM without any undue experimentation.

Bitstream 472 controls the output of a level selector 440. More specifically, in response to a binary "zero" of bitstream 472, selector 440 outputs, for a digital stream 442, the level value provided by digital stream 432. In response to a binary "one" of bitstream 472, selector 430 outputs the value of L5 for digital stream 442. Due to the above-indicated configurations of DM 470 and level selectors 430 and 440, digital stream 442 has the values of L1, L2, L3, L4, and L5 occurring therein with equal probabilities, i.e., Pr(L1)=Pr(L2)=Pr(L3)=Pr(L4)=Pr(L5)=1/5.

In an example embodiment, the values of L1, L2, L3, L4, and L5 can be selected as follows: L1=$A_1$, L2=$A_2$, L3=$A_3$, L4=$A_4$, and L5=$A_5$ (also see Eq. (1)). Thus, in this particular embodiment $A_6$, $A_7$, and $A_8$ are excluded. There are six (x=6) corresponding labels in the operative 16-PAM constellation, which correspond to −$A_6$, −$A_7$, −$A_8$, +$A_6$, +$A_7$, and +$A_8$, respectively. Those six labels are excluded from the codewords of this particular embodiment of electronic encoder 210.

In alternative embodiments, any three of $A_1$-$A_8$ may be excluded.

Electronic encoder 210 further comprises a multiplier 450 and a 16-PAM demapper 460. In operation, multiplier 450 generates a stream 452 of signed amplitudes by multiplying the values provided by digital streams 422 and 442. 16-PAM demapper 460 then operates to convert each of the signed amplitudes of stream 452 into a corresponding 4-bit label of the operative constellation, thereby generating bitstream 212.

In some embodiments of mapper 200 employing the electronic encoder 210 of FIG. 4, the 16-PAM mapper 220 (FIG. 2) and 16-PAM demapper 460 (FIG. 4) may not necessarily be programmed to use identically labeled 16-PAM constellations.

Figure 5:
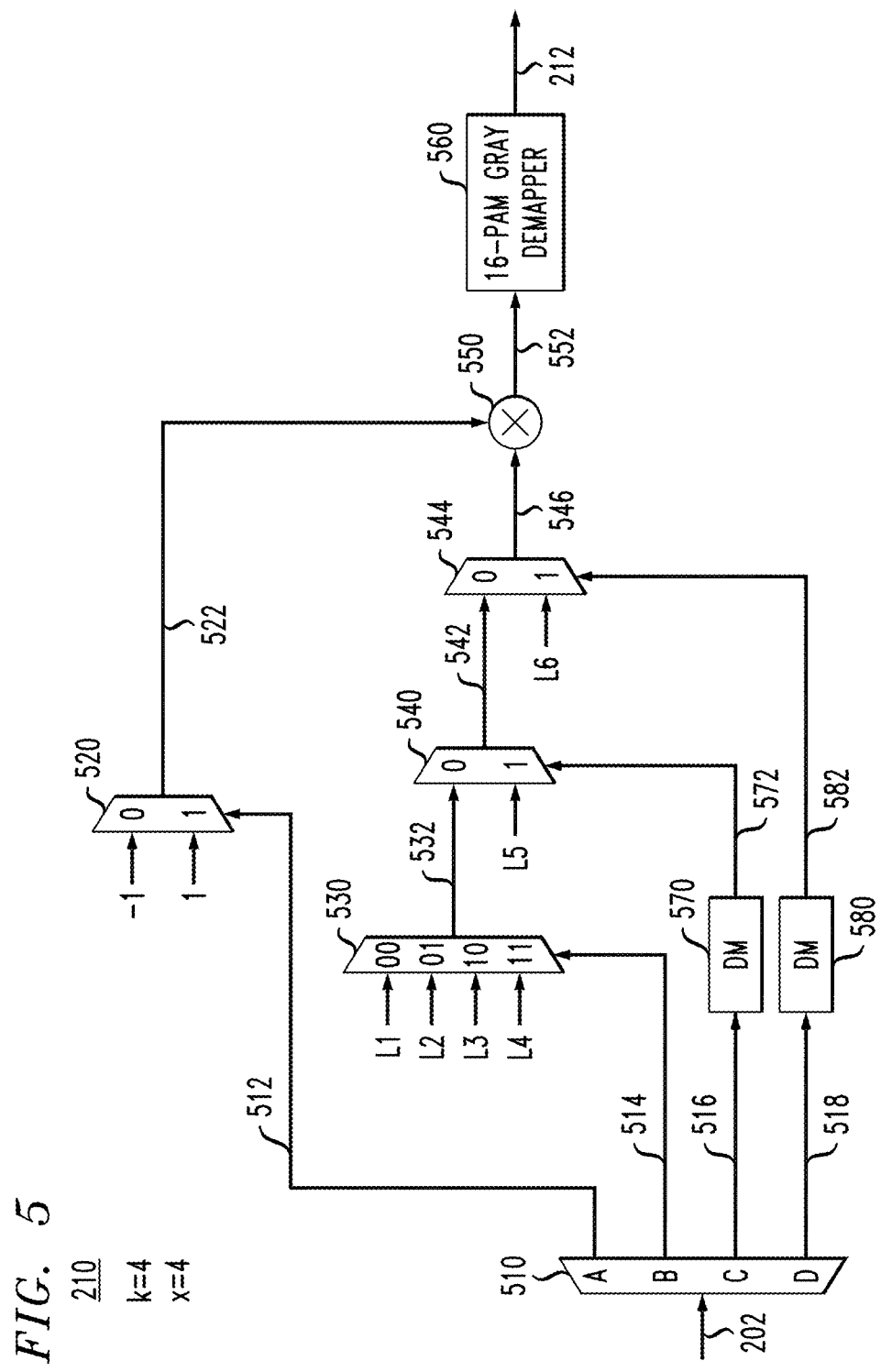
FIG. 5 shows a block diagram of an electronic encoder that can be used in the PAM constellation mapper of FIG. 2 according to yet another embodiment.

FIG. 5 shows a block diagram of electronic encoder 210 (FIG. 2) according to yet another embodiment. This particular embodiment of electronic encoder 210 corresponds to k=4 and x=4. Bitstreams 202 and 212 are explicitly shown in FIG. 5 to better illustrate the relationship between the circuits of FIGS. 2 and 5.

As shown in FIG. 5, electronic encoder 210 comprises a DMUX 510 having an input port and four output ports, labeled A-D. The input port of DMUX 510 is connected to receive bitstream 202 (also see FIG. 2). DMUX 510 operates to demultiplex bitstream 202 into bitstreams 512, 514, 516, and 518, which are outputted from ports A, B, C, and D, respectively.

Bitstream 512 controls the output of a sign selector 520. More specifically, in response to a binary "zero" of bitstream 512, selector 520 outputs −1 for a digital stream 522. In response to a binary "one" of bitstream 512, selector 520 outputs 1 for digital stream 522. When bitstream 512 is an equiprobable bitstream, the values of 1 and −1 occur in digital stream 522 with the equal probability of 1/2.

Bitstream 514 controls the output of a level selector 530. More specifically, in response to a binary "00" of bitstream 514, selector 530 outputs the value of L1 for a digital stream 532. In response to a binary "01" of bitstream 514, selector 530 outputs the value of L2 for digital stream 532. In response to a binary "10" of bitstream 514, selector 530 outputs the value of L3 for digital stream 532. In response to a binary "11" of bitstream 514, selector 530 outputs the value of L4 for digital stream 532. When bitstream 514 is an equiprobable bitstream, the values of L1, L2, L3, and L4 occur in digital stream 532 with the equal probability of 1/4.

Bitstream 516 is applied to a DM 570. In an example embodiment, DM 570 can be a binary CCDM. In this particular embodiment, DM 570 is programmed to transform an equiprobable bitstream into a bitstream, wherein the probabilities of occurrence of binary "zeros" and "ones" are 4/5 and 1/5, respectively. Thus, in operation, DM 570 transforms an equiprobable bitstream 516 into a bitstream 572, wherein Pr(0)=4/5 and Pr(1)=1/5. A person of ordinary skill in the pertinent will readily understand how to make and use such a DM without any undue experimentation.

Bitstream 572 controls the output of a level selector 540. More specifically, in response to a binary "zero" of bitstream 572, selector 540 outputs, for a digital stream 542, the level value provided by digital stream 532. In response to a binary "one" of bitstream 572, selector 530 outputs the value of L5 for digital stream 542. Due to the above-indicated configurations of DM 570 and level selectors 530 and 540, digital stream 542 has the values of L1, L2, L3, L4, and L5 occurring therein with equal probabilities, i.e., Pr(L1)=Pr(L2)=Pr(L3)=Pr(L4)=Pr(L5)=1/5.

Bitstream 518 is applied to a DM 580. In an example embodiment, DM 580 can be a binary CCDM. In this particular embodiment, DM 580 is programmed to transform an equiprobable bitstream into a bitstream, wherein the probabilities of occurrence of binary "zeros" and "ones" are 5/6 and 1/6, respectively. Thus, in operation, DM 580 transforms an equiprobable bitstream 518 into a bitstream 582, wherein Pr(0)=5/6 and Pr(1)=1/6. A person of ordinary skill in the pertinent will readily understand how to make and use such a DM without any undue experimentation.

Bitstream 582 controls the output of a level selector 544. More specifically, in response to a binary "zero" of bitstream 582, selector 544 outputs, for a digital stream 546, the level value provided by digital stream 542. In response to a binary "one" of bitstream 572, selector 544 outputs the value of L6 for digital stream 546. Due to the above-indicated configurations of DMs 570 and 580 and level selectors 530, 540, and 544, digital stream 546 has the values of L1, L2, L3, L4, L5, and L6 occurring therein with equal probabilities, i.e., Pr(L1)=Pr(L2)=Pr(L3)=Pr(L4)=Pr(L5)=Pr(L6)=1/6.

In an example embodiment, the values of L1, L2, L3, L4, L5, and L6 can be selected as follows: L1=$A_1$, L2=$A_2$, L3=$A_3$, L4=$A_4$, L5=$A_5$, and L6=$A_6$ (also see Eq. (1)). Thus, in this particular embodiment $A_7$ and $A_8$ are excluded. There are four (x=4) corresponding labels in the operative 16-PAM constellation, which correspond to $-A_7$, $-A_8$, $+A_7$, and $+A_8$, respectively. These four labels are excluded from the codewords of this particular embodiment of electronic encoder 210.

In alternative embodiments, any two of $A_1$-$A_8$ may be excluded.

Electronic encoder 210 further comprises a multiplier 550 and a 16-PAM demapper 560. In operation, multiplier 550 generates a stream 552 of signed amplitudes by multiplying the values provided by digital streams 522 and 546. 16-PAM demapper 560 then operates to convert each of the signed amplitudes of stream 552 into a corresponding 4-bit label of the operative constellation, thereby generating bitstream 212.

In some embodiments of mapper 200 employing the above-described electronic encoder 210 of FIG. 5, the 16-PAM mapper 220 (FIG. 2) and 16-PAM demapper 560 (FIG. 5) may not necessarily be programmed to use identically labeled 16-PAM constellations.

Based on the embodiments of FIGS. 3-5, a person of ordinary skill in the pertinent art will be able to make and use other embodiments of encoder 210, e.g., corresponding to other values of k and/or x, without any undue experimentation.

Figure 6:
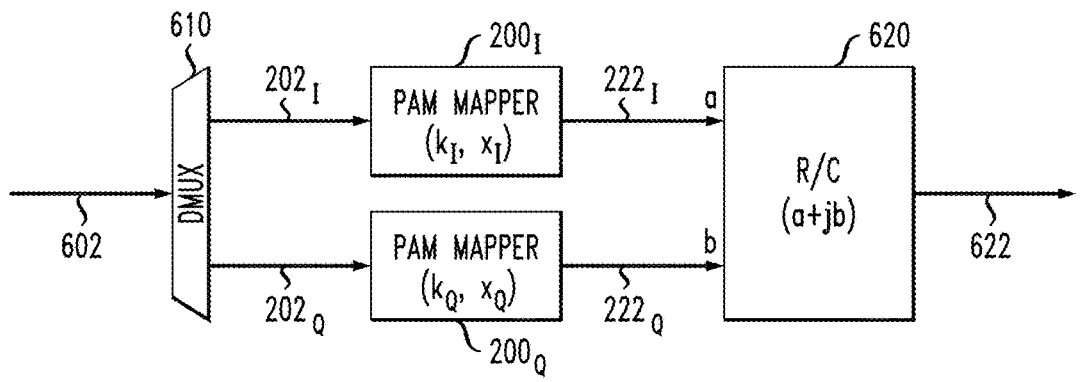
FIG. 6 shows a block diagram of a QAM constellation mapper according to an embodiment.

FIG. 6 shows a block diagram of a QAM constellation mapper 600 according to an embodiment. Mapper 600 comprises a DMUX 610, PAM constellation mappers $200_I$ and $200_Q$, and a real-to-complex (R/C) converter 620 interconnected as indicated in FIG. 6.

In operation, DMUX 610 demultiplexes an input bitstream 602, thereby generating input bitstreams $202_I$ and $202_Q$ for mappers $200_I$ and $200_Q$, respectively. The relative bit rates of bitstreams $202_I$ and $202_Q$ depend on the configuration parameters of mappers $200_I$ and $200_Q$. More specifically, mapper $200_I$ may be programmed using an $N_I$-PAM constellation and employ a corresponding embodiment of electronic encoder 210 configured to exclude $x_I$ labels of that constellation. Mapper $200_Q$ may similarly be programmed using an $N_Q$-PAM constellation and employ a corresponding embodiment of electronic encoder 210 configured to exclude $x_Q$ labels of that constellation. Depending on the embodiment, the numbers $N_I$ and $N_Q$ may be the same or different. The numbers $x_I$ and $x_Q$ may also be the same or different. The relative bit rates with which DMUX 610 demultiplexes input bitstream 602 are thus selected such that the symbol rates of digital output streams $222_I$ and $222_Q$ generated by mappers $200_I$ and $200_Q$, respectively, are equal to one another.

R/C converter 620 operates to convert the real-valued streams $222_I$ and $222_Q$ into a corresponding complex-valued stream 622, e.g., an optical carrier modulated to carry the I stream $222_I$ on an in-phase component thereof and to carry the Q stream $222_Q$ on a quadrature-phase component thereof. For each complex value a+jb of stream 622, stream $222_I$ provides the real part a, while stream $222_Q$ provides the imaginary part b. A person of ordinary skill in the art will understand that different complex values of stream 622 represent different symbols of a QAM constellation. The effective size of this QAM constellation is $(N_I-x_I)\times(N_Q-x_Q)$, e.g., as illustrated below in reference to the examples shown in FIGS. 7A-7D. Due to the above-indicated characteristics of the mappers 200, different symbols of the QAM constellation will occur in stream 622 with equal probabilities when input bitstream 602 is an equiprobable bitstream.

In some embodiments of optical data transmitters, R/C converter 620 may be absent.

Figure 7A:
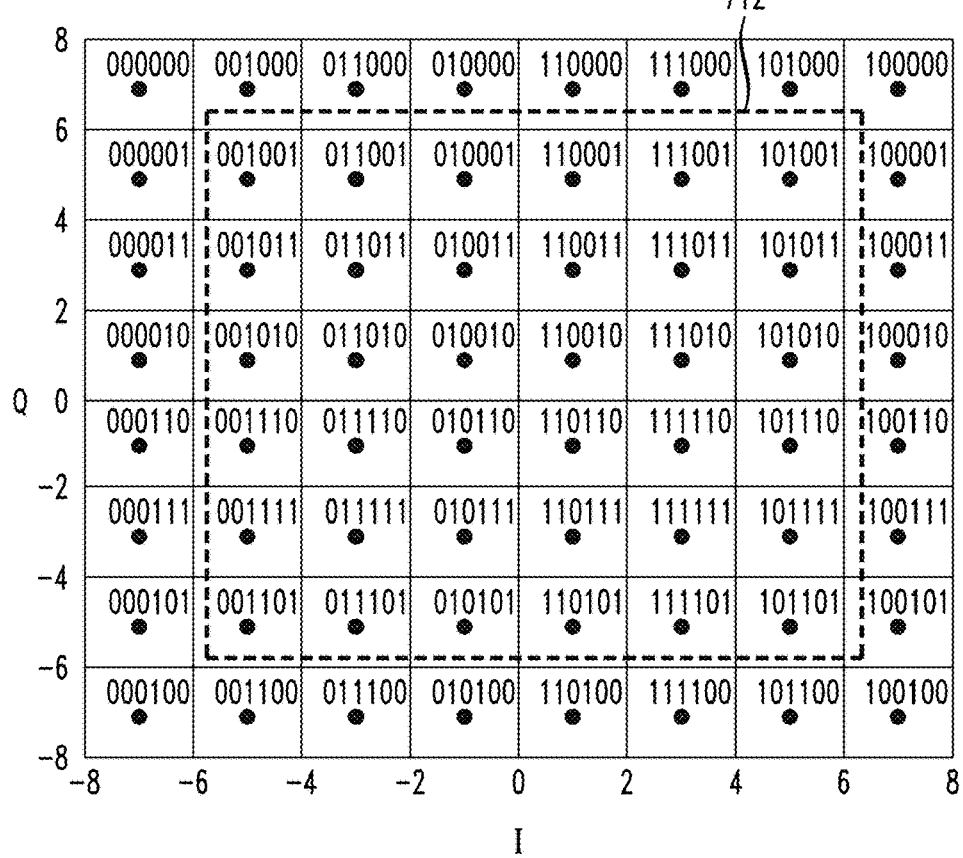

FIGS. 7A-7D graphically illustrate several QAM constellations that can be implemented using mapper 600 according to example embodiments. More specifically, FIG. 7A corresponds to the embodiment of mapper 600 corresponding to $k_I=k_Q=3$ and $X_I=X_Q=2$. FIG. 7B corresponds to the embodiment of mapper 600 corresponding to $k_I=k_Q=4$ and $X_I=X_Q=2$. FIG. 7C corresponds to the embodiment of mapper 600 corresponding to $k_I=k_Q=4$ and $X_I=X_Q=4$. FIG. 7D corresponds to the embodiment of mapper 600 corresponding to $k_I=k_Q=4$ and $X_I=X_Q=6$. Herein, $k_I$ is the number of bits in the labels of the PAM constellation corresponding to the I-dimension, and $k_Q$ is the number of bits in the labels of the PAM constellation corresponding to the Q-dimension.

The illustrated embodiments provide "square" effective QAM constellations 712, 722, 732, and 742. Herein, the term "square" means that the effective constellation has an equal number of rows and columns in which the constellation points are arranged on the rectangular grid of the IQ plane. However, embodiments are not so limited. More specifically, alternative embodiments may provide various "rectangular" effective QAM constellations. Herein, the term "rectangular" means that the effective constellation has a first number of rows and a second number of columns, in which the constellation points are arranged on the rectangular grid of the IQ plane, with the first and second numbers being different from one another.

Square effective QAM constellations may be described using the number B expressed as follows:

$$B=(2^k-x)/2 \qquad (2)$$

where $k=k_I=k_Q$ and $x=X_I=X_Q$. The number of constellation points in such a square effective QAM constellation is $4B^2$. For the square effective QAM constellations 712, 722, 732, and 742 of FIGS. 7A-7D, the number B is 3, 7, 6, and 5, respectively.

FIG. 7A graphically shows a Gray-coded 64-QAM constellation 710, with the labels shown next to the constellation points thereof. There are 64 constellation points, each having a label of $k_I+k_Q=6$ bits. 28 of the 64 constellation points are excluded by the electronic encoders 210 of mappers $200_I$ and $200_Q$ (also see FIGS. 2 and 6). The remaining 36 constellation points are enclosed by dashed line 712. When input bitstream 602 is an equiprobable bitstream, different symbols of the square effective 36-QAM constellation 712 will occur in stream 622 with equal probabilities. The 28 excluded symbols of constellation 710 are not present in stream 622.

FIG. 7B graphically shows a Gray-coded 256-QAM constellation 720, with the labels shown next to the constellation points thereof. There are 256 constellation points, each having a label of $k_I+k_Q=8$ bits. 60 of the 256 constellation points are excluded by the electronic encoders 210 of mappers $200_I$ and $200_Q$ (also see FIGS. 2 and 6). The remaining 196 constellation points are enclosed by dashed line 722. When input bitstream 602 is an equiprobable bitstream, different symbols of the square effective 196-QAM constellation 722 will occur in stream 622 with equal probabilities. The 60 excluded symbols of constellation 720 are not present in stream 622.

FIG. 7C also graphically shows Gray-coded 256-QAM constellation 720, with the labels shown next to the constellation points thereof. 112 of the 256 constellation points are excluded by the electronic encoders 210 of mappers 200$_I$ and 200$_Q$ (also see FIGS. 2 and 6). The remaining 144 constellation points are enclosed by dashed line 732. When input bitstream 602 is an equiprobable bitstream, different symbols of the square effective 144-QAM constellation 732 will occur in stream 622 with equal probabilities. The 112 excluded symbols of constellation 720 are not present in stream 622.

FIG. 7D also graphically shows Gray-coded 256-QAM constellation 720, with the labels shown next to the constellation points thereof. 156 of the 256 constellation points are excluded by the electronic encoders 210 of mappers 200$_I$ and 200$_Q$ (also see FIGS. 2 and 6). The remaining 100 constellation points are enclosed by dashed line 742. When input bitstream 602 is an equiprobable bitstream, different symbols of the square effective 100-QAM constellation 742 will occur in stream 622 with equal probabilities. The 156 excluded symbols of constellation 720 are not present in stream 622.

Figure 8A:
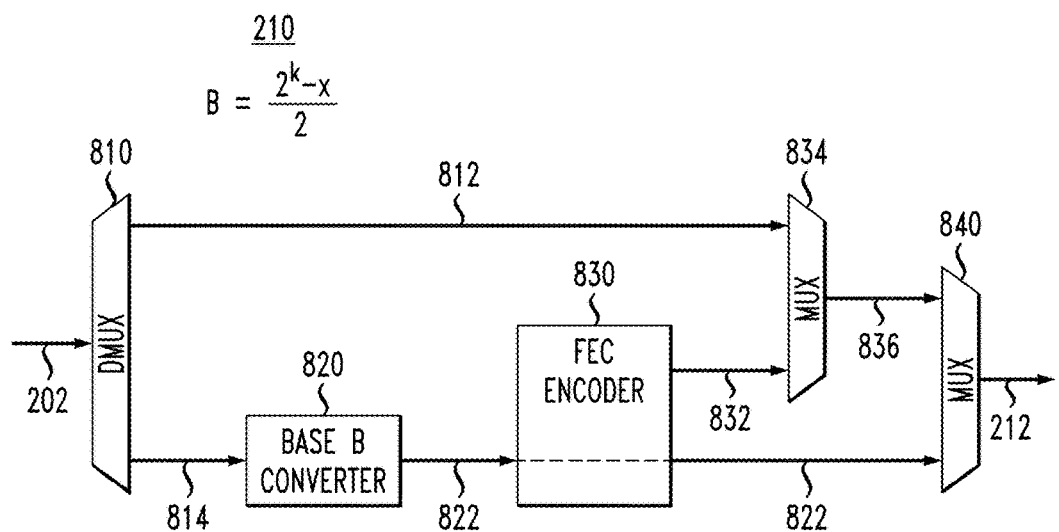
FIGS. 8A-8B show block diagrams of an electronic encoder that can be used in the PAM constellation mapper of FIG. 2 according to yet another embodiment.
Figure 8B:
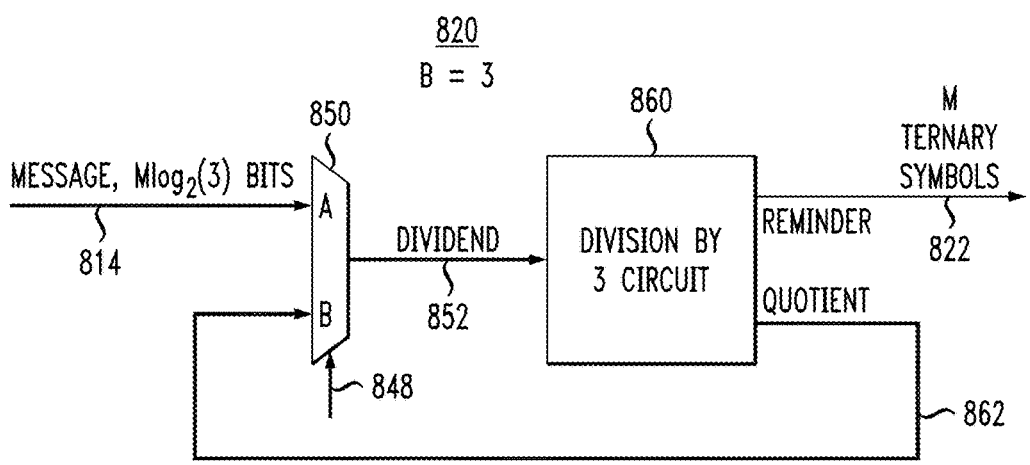

FIGS. 8A-8B show block diagrams of label-exclusion encoder 210 (FIG. 2) according to yet another embodiment. More specifically, FIG. 8A shows an overall block diagram of encoder 210. FIG. 8B shows a block diagram of an example circuit that can be used to implement a base-B converter 820 of encoder 210 shown in FIG. 8A.

Referring to FIG. 8A, encoder 210 comprises a DMUX 810, base-B converter 820, an FEC encoder 830, a multiplexer (MUX) 834, and a MUX 840. In some embodiments, FEC encoder 830 and MUX 834 may be absent. In such embodiments, bitstream 836 is replaced by bitstream 812.

DMUX 810 operates to demultiplex bitstream 202 into bitstreams 812 and 814. The relative bit rates of bitstreams 812 and 814 depend on the specific embodiment and are selected such that the relative bit rates of bitstreams 822 and 836 are 1:(k−1). As such, the configuration of DMUX 810 depends on the numbers k and x and on the rate of FEC encoder 830.

Base-conversion circuit 820 operates to convert bitstream 814 into a bitstream 822, e.g., as described below in reference to FIG. 8B. The rate of conversion is such that, in response to a "message" having M·log$_2$ (B) bits delivered by bitstream 814, circuit 820 outputs M×B bits for bitstream 822.

In an example embodiment, FEC encoder 830 is a systematic FEC encoder. As known to those skilled in the pertinent art, a systematic FEC encoder operates to generate parity bits without altering the corresponding information bits. As such, bitstream 822 passes through FEC encoder 830 unaltered. The parity bits corresponding to bitstream 822 form bitstream 832. MUX 834 then multiplexes bitstreams 812, thereby generating bitstream 836 for MUX 840.

MUX 840 operates to generate bitstream 212 by multiplexing bitstreams 822 and 836 such that one bit of bitstream 836 is pre-pended to the corresponding (k−1) bits of bitstream 822. As a result, each of such k-bit words in the generated bitstream 212 is a codeword of electronic encoder 210 in the sense explained above in reference to FIG. 2.

FIG. 8B shows a block diagram of circuit 820 corresponding to B=3. As such, in response to a "message" having M·log$_2$ (3) bits delivered by bitstream 814, circuit 820 outputs M ternary symbols for bitstream 822. As shown, circuit 820 comprises a selector 850 and a "division-by-3" circuit 860.

Selector 850 is controlled by a control signal 848, which causes the selector to select input A thereof one time and input B thereof (M-1) subsequent times. A$_n$ output 852 of selector 850 provides a dividend for circuit 860 to act on. A reminder of the division by 3 is outputted for bitstream 822. A quotient 862 of the division by 3 is looped back to input B of selector 850. A person of ordinary skill in the art will understand that, in this manner, circuit 860 performs long division by 3 on each "message" delivered by bitstream 814.

In embodiments corresponding to B=5, 6, and 7 (see, e.g., FIGS. 7B-7D), the "division-by-3" circuit 860 is replaced by a similar one of "division-by-5," "division-by-6," and "division-by-7" circuits, respectively.

Figure 9A:
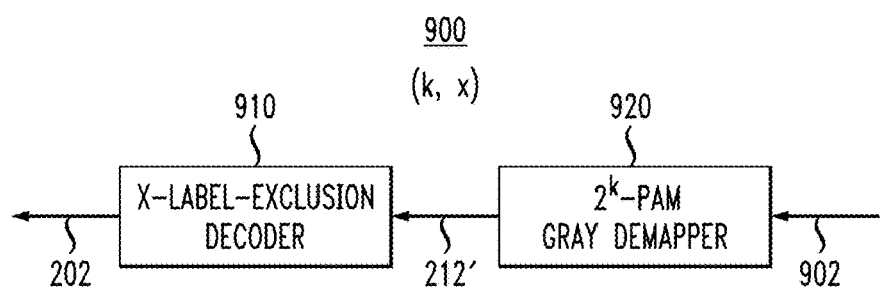
FIGS. 9A-9B show block diagrams of a PAM constellation demapper according to an embodiment.

FIG. 9A shows a block diagram of a PAM constellation demapper 900 according to an embodiment. Demapper 900 is compatible with mapper 200 of FIG. 2. Demapper 900 comprises a 2$^k$-PAM Gray demapper 920 and an electronic decoder 910 serially connected as indicated in FIG. 9. The positive integers k and x are the configuration parameters of demapper 900. In some embodiments, two instances of PAM constellation demapper 900 can be used to construct a corresponding QAM constellation demapper, e.g., using the concept illustrated by FIG. 6.

In operation, demapper 900 receives a stream 902 of digitized measurements of the received PAM signal. Demapper 920 uses the operative 2$^k$-PAM constellation, in a conventional manner, to convert stream 902 into a bitstream 212'. In the absence of errors, bitstream 212' is the same as bitstream 212 of FIG. 2. Errors (if any) can be corrected, e.g., using an FEC decoder (not explicitly shown in FIG. 9), provided that the transmitted signal is FEC-encoded at the corresponding transmitter. For example, such an FEC decoder may be incorporated into decoder 910 in a manner consistent with the encoder embodiment shown in FIG. 8.

Decoder 910 operates to processes bitstream 212' to recover bitstream 202 (also see FIG. 2). In an example embodiment, the processing implemented in decoder 910 is inverse to the processing implemented in encoder 210 (FIG. 2).

Figure 9B:
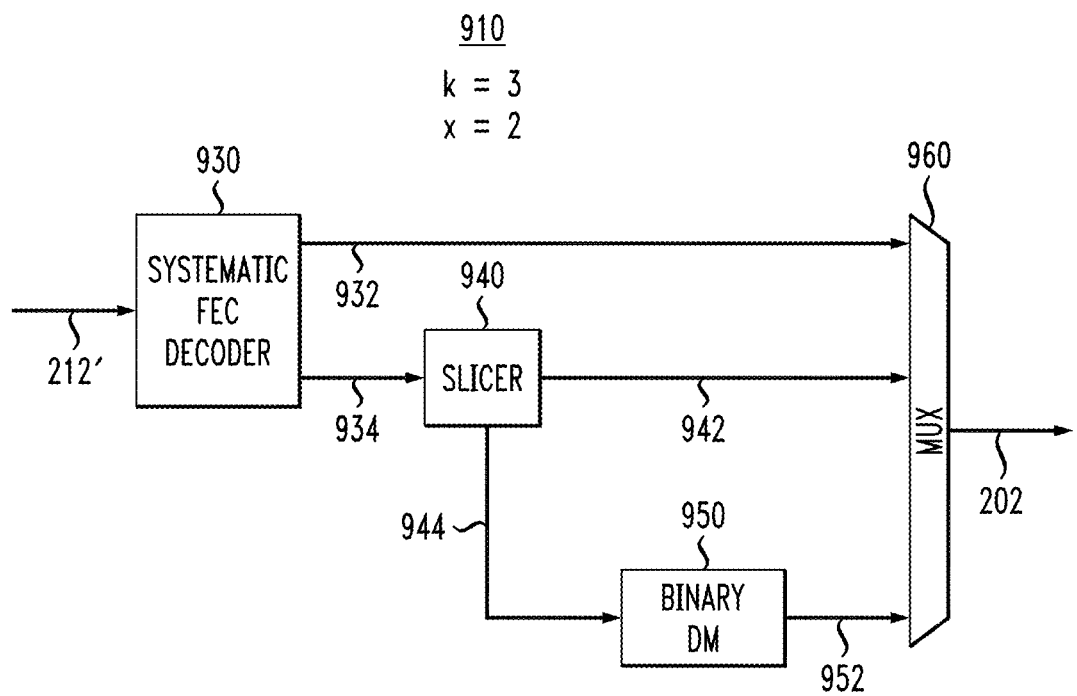

FIG. 9B shows a block diagram of an example embodiment of decoder 910 corresponding to k=3 and x=2. As shown, decoder 910 comprises a systematic FEC decoder 930, a slicer 940, a binary DM 950, and a MUX 960.

FEC decoder 930 operates to correct errors (if any) in bitstream 212' using the corresponding FEC code. After discarding the parity bits, FEC decoder 930 outputs sign bits via bitstream 932 and outputs amplitude levels via data stream 934. Slicer 940 then processes data stream 934 to generate bitstreams 942 and 944 in the following manner:
  (i) if the input level is L1, then a binary "0" is outputted for bitstream 942, and a binary "0" is outputted for bitstream 944;
  (ii) if the input level is L2, then a binary "1" is outputted for bitstream 942, and a binary "0" is outputted for bitstream 944; and
  (iii) if the input level is L3, then there is no output for bitstream 942, and a binary "1" is outputted for bitstream 944.

DM 950 operates to convert bitstream 944 into bitstream 952 by performing an operation that is inverse to that of DM 370 (FIG. 3). MUX 960 operates to properly multiplex bitstreams 932, 942, and 952, thereby recovering bitstream 202.

Figure 10:
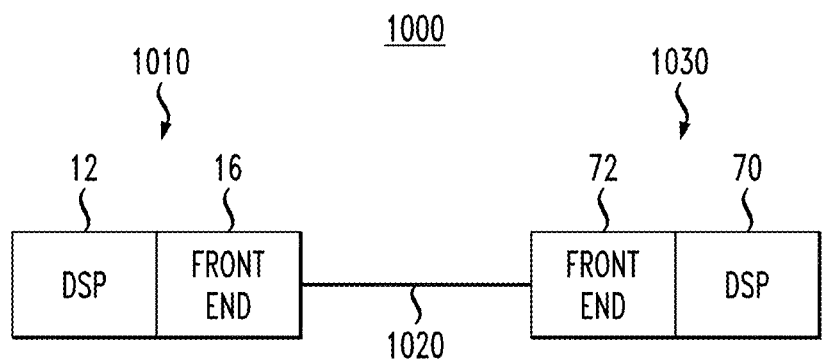
FIG. 10 shows a block diagram of a communication system in which at least some embodiments can be practiced.

FIG. 10 shows a block diagram of a communication system 1000 in which at least some embodiments can be practiced. System 1000 comprises a data transmitter 1010 and a data receiver 1030 configured to communicate via a communication medium 1020. Depending on the embodiment, communication medium 1020 may include a wireless medium, a wire line or cable, an optical fiber, etc.

Data transmitter 1010 comprises a digital signal processor (DSP) 12 and a front-end circuit 16. In operation, DSP 12 transforms one or more bitstreams into one or more data-encoded digital signals suitable for driving front-end circuit 16. Front-end circuit 16 then operates to convert the one or more data-encoded digital signals received form DSP 12 into signals suitable for transmission via communication medium 1020.

Data receiver 1030 comprises a front-end circuit 72 and a DSP 70. In operation, front-end circuit 72 performs measurements on the signal(s) received, via communication medium 1020, from data transmitter 1010 and provides corresponding streams of digital samples of said measurements to DSP 70. DSP 70 then operates to process the digital-sample streams of said measurements to recover the one or more bitstreams encoded by data transmitter 1010 in the signals transmitted to the communication medium 1020.

In an example embodiment, DSP 12 may include mapper 200. DSP 70 may include demapper 900. Example optical embodiments of data transmitter 1010 and data receiver 1030 that can be used when communication medium 1020 comprises a fiber-optic link are described in more detail below in reference to FIGS. 11-12.

Figure 11:
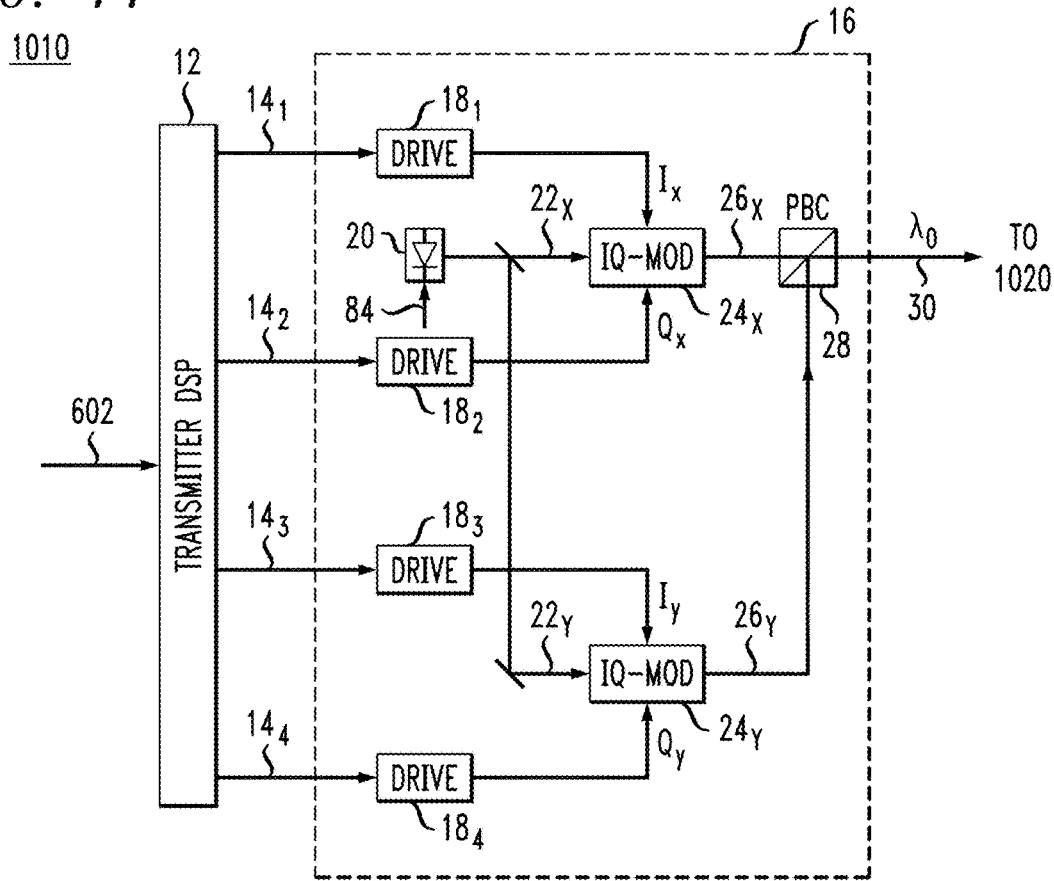
FIG. 11 shows a block diagram of an optical data transmitter that can be used in the communication system of FIG. 10 according to an embodiment.

FIG. 11 shows a block diagram of an optical data transmitter 1010 that can be used in system 1000 (FIG. 10) according to an embodiment.

For illustration purposes, transmitter 1010 is shown to receive bitstream 602, which is applied DSP 12. DSP 12 processes bitstream 602 to generate digital signals $14_1$-$14_4$. In an example embodiment, DSP 12 may perform, inter alia, one or more of the following: (i) encode input data stream 602 using a suitable code; (ii) parse the resulting encoded data stream into a sequence of bit-words; (iii) for each bit-word, determine a corresponding constellation symbol of the operative QAM constellation; (iv) generate a digital drive signal carrying the constellation symbol. For example, in each modulation time slot, signals $14_1$ and $14_2$ may carry digital values that represent the I component and Q component, respectively, of a QAM constellation symbol intended for transmission using a first (e.g., X) polarization of light. Signals $14_3$ and $14_4$ may similarly carry digital values that represent the I and Q components, respectively, of a QAM constellation symbol intended for transmission using a second (e.g., Y) polarization of light.

In some embodiments, DSP 12 may include four instances of circuit 200 connected in parallel, each being in the processing chain connected to generate a respective one of digital signals $14_1$-$14_4$. In some other embodiments, DSP 12 may include two instances of circuit 600, i.e., one per polarization. Such instances of circuit 600 may or may not include circuit 620.

Front-end circuit 16 is an electrical-to-optical (E/O) converter that operates to transform digital signals $14_1$-$14_4$ into a corresponding modulated optical output signal 30. More specifically, drive circuits $18_1$ and $18_2$ transform digital signals $14_1$ and $14_2$, as known in the pertinent art, into electrical analog drive signals $I_X$ and $Q_X$, respectively. Drive signals $I_X$ and $Q_X$ are then used, in a conventional manner, to drive an optical I-Q modulator $24_X$. In response to drive signals $I_X$ and $Q_X$, optical I-Q modulator $24_X$ operates to modulate an X-polarized beam $22_X$ of light supplied thereto by a laser source 20 as indicated in FIG. 11, thereby generating a modulated optical signal $26_X$.

The output wavelength of laser source 20 is wavelength $\lambda_0$. The optical output power of laser source 20 can be set and/or changed in response to a control signal 84.

Drive circuits $18_3$ and $18_4$ similarly transform digital signals $14_3$ and $14_4$ into electrical analog drive signals $I_Y$ and $Q_Y$, respectively. In response to drive signals $I_Y$ and $Q_Y$, an optical I-Q modulator $24_Y$ operates to modulate a Y-polarized beam $22_Y$ of light supplied by laser source 20 as indicated in FIG. 11, thereby generating a modulated optical signal $26_Y$. A polarization beam combiner (PBC) 28 operates to combine modulated optical signals $26_X$ and $26_Y$, thereby generating the optical output signal 30, said optical output signal being a polarization-division-multiplexed (PDM) signal. Optical output signal 30 may then be directed for transmission to optical fiber 1020.

Figure 12:
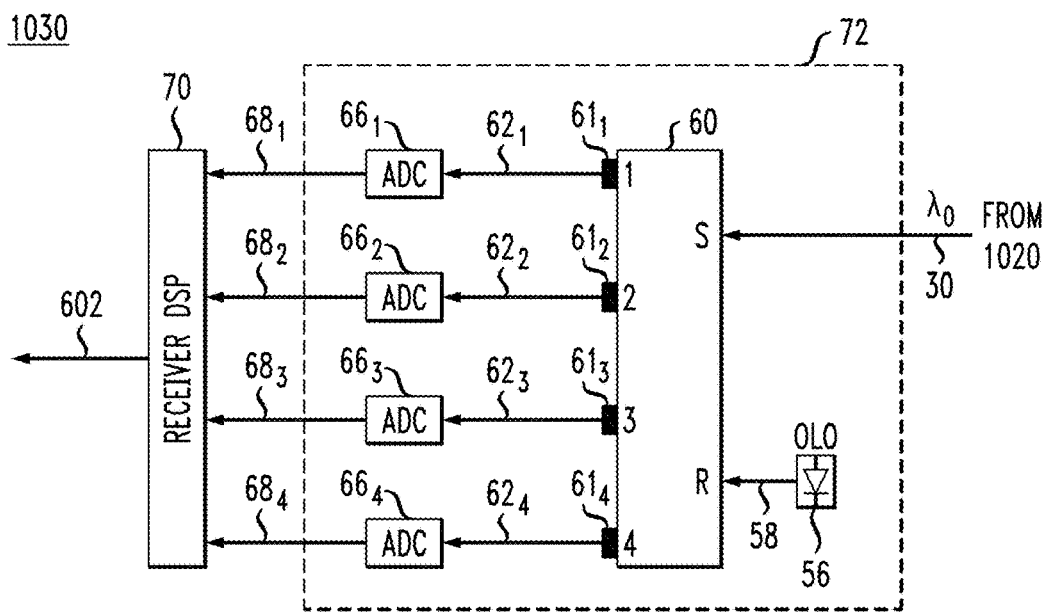
FIG. 12 shows a block diagram of an optical data receiver that can be used in the communication system of FIG. 10 according to an embodiment.

FIG. 12 shows a block diagram of an optical data receiver 1030 that can be used in system 1000 (FIG. 10) according to an embodiment.

Front-end circuit 72 of receiver 1030 is an optical-to-electrical (O/E) converter comprising an optical hybrid 60, light detectors $61_1$-$61_4$, analog-to-digital converters (ADCs) $66_1$-$66_4$, and an optical local-oscillator (OLO) source 56. Optical hybrid 60 has (i) two input ports labeled S and R and (ii) four output ports labeled 1 through 4. Input port S receives optical signal 30 from optical fiber 1020. Input port R receives an OLO signal 58 generated by OLO source (e.g., laser) 56. OLO signal 58 has an optical-carrier wavelength (frequency) that is sufficiently close to that of signal 30 to enable coherent (e.g., intradyne) detection of the latter optical signal.

In an example embodiment, optical hybrid 60 operates to mix optical signal 30 and OLO signal 58 to generate different mixed (e.g., by interference) optical signals (not explicitly shown in FIG. 12). Light detectors $61_1$-$61_4$ then convert the mixed optical signals into four electrical signals $62_1$-$62_4$ that are indicative of complex values corresponding to two orthogonal-polarization components of optical signal 30. For example, electrical signals $62_1$ and $62_2$ may be indicative of an analog I signal and an analog Q signal, respectively, or linearly independent mixtures thereof corresponding to a first (e.g., horizontal, h) polarization component of optical signal 30. Electrical signals $62_3$ and $62_4$ may similarly be indicative of an analog I signal and an analog Q signal, respectively, or linearly independent mixtures thereof corresponding to a second (e.g., vertical, v) polarization component of optical signal 30.

Each of electrical signals $62_1$-$62_4$ is converted into digital form in a corresponding one of ADCs $66_1$-$66_4$. Optionally, each of electrical signals $62_1$-$62_4$ may be low-pass filtered and amplified in a corresponding electrical amplifier (not explicitly shown) prior to the resulting signal being converted into digital form. Digital signals $68_1$-$68_4$ produced by ADCs $66_1$-$66_4$, respectively, are then processed by a DSP 70 to recover the data of the original bitstream 602 applied to transmitter 1010.

In an example embodiment, DSP 70 may perform, inter alia, one or more of the following: (i) signal processing directed at dispersion compensation; (ii) signal processing directed at compensation of nonlinear distortions; (iii) electronic compensation for polarization rotation and polarization de-multiplexing; (iv) compensation of frequency offset between OLO 56 and laser source 20; (v) error correction based on FEC-encoding (if any) performed at DSP 12; (vi) mapping of a set of complex values conveyed by digital signals 68₁-68₄ onto the operative QAM constellations to determine a corresponding constellation symbol thereof, and (vii) concatenating the labels of the constellation symbols determined through said mapping to reconstruct data stream 202.

In some embodiments, DSP 70 may include four instances of circuit 900 connected in parallel and being in the processing chain connected to process digital signals 68₁-68₄.

Figure 13:
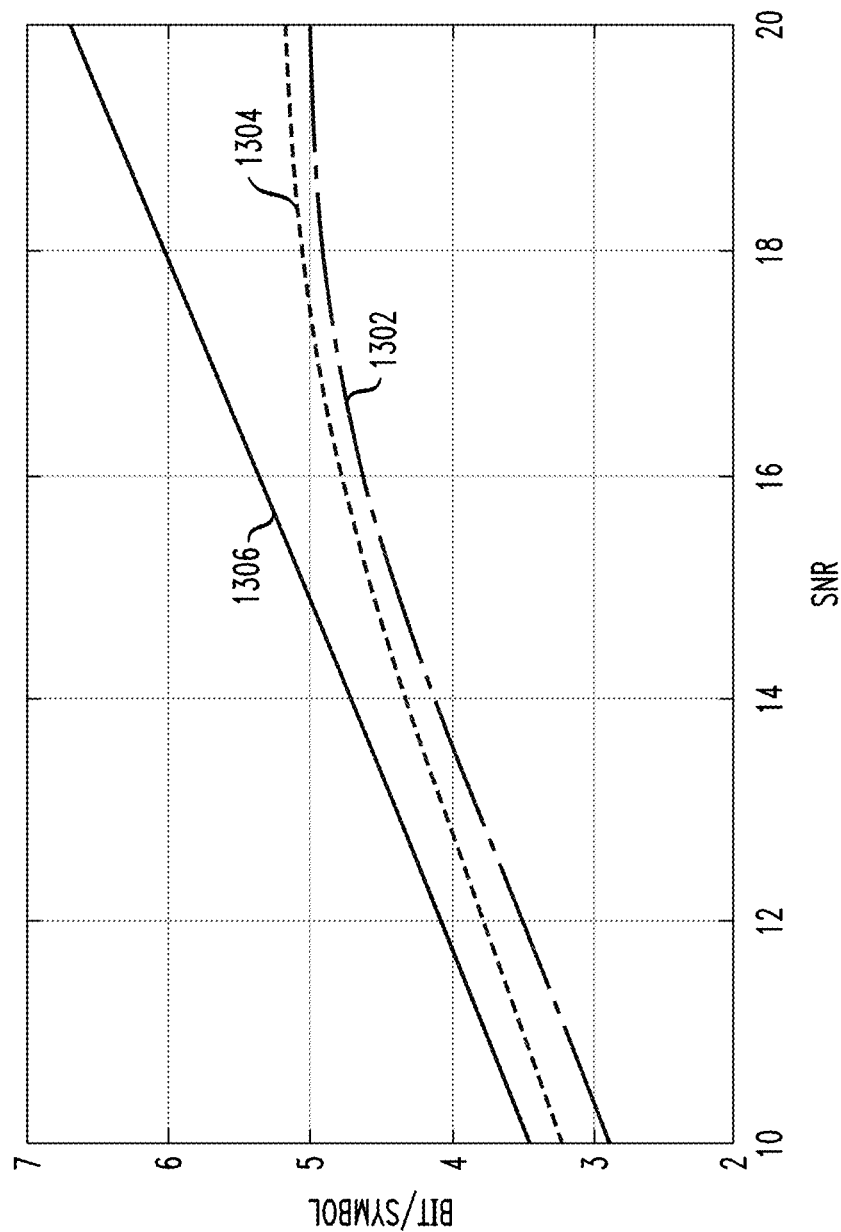
FIG. 13 graphically illustrates example performance improvements that may be expected according to an embodiment.

FIG. 13 graphically illustrates example improvements that the inventors believe may be achievable according to an embodiment. More specifically, curve 1306 shows the Shannon limit, for optical data transmission in system 1000, as a function of signal-to-noise ratio (SNR). Curve 1302 shows a throughput that the inventors believe may be achievable using a conventional Gray-coded 32-QAM constellation, wherein the constellation symbols are arranged on the IQ plane in 6 rows having 4, 6, 6, 6, 6, and 4 symbols respectively, with each quadrant having 8 identically arranged symbols. Curve 1304 shows a throughput that the inventors believe may be obtainable using a Gray-coded 36-QAM constellation 712 of FIG. 7A. Thus, the inventors believe that a 36-QAM constellation 712 can outperform a conventional 32-QAM constellation, as indicated by the smaller distance of curve 1304 to the Shannon limit 1306 compared to that of curve 1302.

According to an example embodiment disclosed above, e.g., in the summary section and/or in reference to any one or any combination of some or all of FIGS. 1-13, provided is an apparatus comprising an optical data transmitter (e.g., 1010, FIG. 11) including: an optical modulator (e.g., 24, FIG. 11); and an electronic controller (e.g., 12, FIG. 11) to operate the optical modulator to optically output a sequence of symbols in response to a bitstream (e.g., 602, FIG. 11), the electronic controller being configured to select the symbols by Gray-coded mapping of a $4B^2$-QAM constellation, where $B \neq 2^k$, B and k are positive integers, and B is greater than one.

In some embodiments of the above apparatus, the electronic controller is configured to cause each one of the symbols to carry 2 k bits, where $B < 2^{k-1}$.

In some embodiments of any of the above apparatus, B=3 (e.g., 712, FIG. 7A) or B=5 (e.g., 742, FIG. 7D) or B=6 (e.g., 732, FIG. 7A) or B=7 (e.g., 722, FIG. 7B).

In some embodiments of any of the above apparatus, the electronic controller is configured to map a random or pseudorandom bitstream to different symbols of the constellation with about equal probability.

In some embodiments of any of the above apparatus, the electronic controller comprises: a constellation mapper (e.g., 220, FIG. 2) to select the symbols in response to a bitstream (e.g., 212, FIG. 2) and based on symbol labels; and an electronic encoder (e.g., 210, FIG. 2) to generate the bitstream in response to a data stream (e.g., 202, FIG. 2) such that bit-words of the bitstream are limited to the labels.

In some embodiments of any of the above apparatus, the electronic encoder comprises: a first distribution matcher (e.g., 370, 470, 570, FIGS. 3-5) to generate a first binary control signal (e.g., 372, 472, 572, FIGS. 3-5) having first fixed unequal probabilities of ones and zeros therein; and a first selector (e.g., 340, 440, 540, FIGS. 3-5) to select different amplitudes of the constellation in response to the first binary control signal.

In some embodiments of any of the above apparatus, the electronic encoder further comprises: a second distribution matcher (e.g., 580, FIG. 5) to generate a second binary control signal (e.g., 582, FIG. 5) having second fixed unequal probabilities of ones and zeros therein, the second fixed unequal probabilities being different from the first fixed unequal probabilities; and a second selector (e.g., 544, FIG. 5) to select various amplitudes of the constellation in response to the second binary control signal.

In some embodiments of any of the above apparatus, the electronic encoder is configured to select different amplitudes of the constellation based on a stream of remainders (e.g., 822, FIG. 8B) of a long-division operation.

In some embodiments of any of the above apparatus, the electronic encoder comprises an FEC encoder (e.g., 830, FIG. 8A).

In some embodiments of any of the above apparatus, the constellation is a square QAM constellation.

According to another example embodiment disclosed above, e.g., in the summary section and/or in reference to any one or any combination of some or all of FIGS. 1-13, provided is an apparatus comprising a data transmitter (e.g., 1000, FIG. 11) including: a front-end circuit (e.g., 16, FIG. 10); and an electronic controller (e.g., 12, FIG. 10) to operate the front-end circuit to output a data-modulated signal carrying a sequence of symbols; and wherein the electronic controller comprises: a constellation mapper (e.g., 220, FIG. 2) to select symbols for the sequence in response to a bitstream (e.g., 212, FIG. 2) and based on symbol labels of a constellation; and an electronic encoder (e.g., 210, FIG. 2) to generate the bitstream in response to a data stream (e.g., 202, FIG. 2) such that the bitstream carries labels of a subset of symbols of the constellation. Herein, the term "subset" is to be construed to mean some but not all elements of the corresponding set, e.g., not all of the symbols of the constellation.

In some embodiments of the above apparatus, the electronic encoder is configured to exclude at least two constellation-symbol labels of the constellation from appearing in the bitstream.

In some embodiments of any of the above apparatus, the constellation is a rectangular or square QAM constellation.

In some embodiments of any of the above apparatus, the symbols of the subset are Gray-coded.

In some embodiments of any of the above apparatus, the electronic controller is configured to cause each of the symbols of the subset to occur in the sequence with equal probability when the data stream is a random or pseudorandom bitstream.

In some embodiments of any of the above apparatus, the electronic encoder comprises: a first distribution matcher (e.g., 370, 470, 570, FIGS. 3-5) to generate a first binary control signal (e.g., 372, 472, 572, FIGS. 3-5) having first fixed unequal probabilities of ones and zeros therein; and a first selector (e.g., 340, 440, 540, FIGS. 3-5) to select different amplitudes of the constellation in response to the first binary control signal.

In some embodiments of any of the above apparatus, the electronic encoder further comprises: a second distribution matcher (e.g., 580, FIG. 5) to generate a second binary control signal (e.g., 582, FIG. 5) having second fixed unequal probabilities of ones and zeros therein, the second fixed unequal probabilities being different from the first fixed unequal probabilities; and a second selector (e.g., 544, FIG. 5) to select various amplitudes of the constellation in response to the second binary control signal.

In some embodiments of any of the above apparatus, the electronic encoder comprises an amplitude-selection circuit (e.g., 820, FIG. 8) to select different amplitudes of the constellation based on a stream of remainders of a long-division operation applied to a sub-stream (e.g., 814, FIG. 8) of the data stream.

In some embodiments of any of the above apparatus, the constellation is a PAM or QAM constellation.

In some embodiments of any of the above apparatus, the electronic controller (e.g., 12, FIG. 11) is configured to select each of the symbols from a set of 4 $B^2$ different QAM symbols, where $B \neq 2^k$ and B and k are positive integers.

In some embodiments of any of the above apparatus, the electronic controller is configured to cause each one of the different QAM symbols to carry 2 k bits, where $B<2^{k-1}$.

In some embodiments of any of the above apparatus, B=3 (e.g., 712, FIG. 7A) or B=5 (e.g., 742, FIG. 7D) or B=6 (e.g., 732, FIG. 7A) or B=7 (e.g., 722, FIG. 7B).

In some embodiments of any of the above apparatus, the electronic controller is configured to cause each of the $4B^2$ different QAM symbols to occur in the sequence with equal probability when the data stream is a random or pseudorandom data stream.

In some embodiments of any of the above apparatus, the electronic encoder comprises an FEC encoder (e.g., 830, FIG. 8).

In some embodiments of any of the above apparatus, the front-end circuit comprises a laser (e.g., 20, FIG. 11) and an optical modulator (e.g., 24, FIG. 11) optically coupled to the laser.

According to yet another example embodiment disclosed above, e.g., in the summary section and/or in reference to any one or any combination of some or all of FIGS. 1-13, provided is an apparatus comprising an optical data transmitter (e.g., 1010, FIG. 11) including: an optical modulator (e.g., 24, FIG. 11); and an electronic controller (e.g., 12, FIG. 11) to operate the optical modulator to optically output a sequence of symbols in response to a bitstream (e.g., 602, FIG. 11), the electronic controller being configured to select the symbols from a Gray-coded QAM constellation to obtain a $4B^2$-symbol constellation, where $B \neq 2^k$, B and k are positive integers, and B is greater than one.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred—to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

We claim:

1. An apparatus, comprising an optical data transmitter comprising:
   an electronic controller configured to select a sequence of symbols by Gray-coded mapping of a $4B^2$-QAM constellation in response to an input bitstream, wherein $B \neq 2^k$, B and k are positive integers, and B is greater than one; and
   an optical modulator operably connected to the electronic controller; the electronic controller configured to forward the selected sequence of symbols to the optical modulator and the optical modulator configured to convert the selected sequence of symbols into a data-encoded optical signal suitable for transmission via a communication medium.

2. The apparatus of claim 1, wherein the electronic controller is configured to cause each one of the symbols to carry 2k bits, where $B<2^{k-1}$.

3. The apparatus of claim 1, wherein B is equal to 3, 5, 6, or 7.

4. The apparatus of claim 1, wherein the electronic controller is configured to map a random or pseudorandom bitstream to different symbols of the $4B^2$-QAM constellation with about equal probability.

5. The apparatus of claim 1, wherein the electronic controller comprises:
   a constellation mapper configured to select the symbols in response to an encoded bitstream and based on symbol labels; and
   an electronic encoder configured to generate the encoded bitstream in response to a data stream corresponding to the input bitstream such that bit-words of the encoded bitstream are limited to the symbol labels.

6. The apparatus of claim 5, wherein the electronic encoder comprises:
   a first distribution matcher configured to generate a first binary control signal having first fixed unequal probabilities of ones and zeros therein; and
   a first selector configured to select amplitudes of the $4B^2$-QAM constellation in response to the first binary control signal.

7. The apparatus of claim 6, wherein the electronic encoder further comprises:
   a second distribution matcher configured to generate a second binary control signal having second fixed unequal probabilities of ones and zeros therein, the second fixed unequal probabilities being different from the first fixed unequal probabilities; and
   a second selector configured to select amplitudes of the $4B^2$-QAM constellation in response to the second binary control signal.

8. The apparatus of claim 5, wherein the electronic encoder is configured to select amplitudes of the $4B^2$-QAM constellation based on a stream of remainders of a long-division operation.

9. The apparatus of claim 5, wherein the electronic encoder comprises an FEC encoder.

10. The apparatus of claim 1, wherein the $4B^2$-QAM constellation is a square QAM constellation.

* * * * *